United States Patent [19]

Kress et al.

[11] Patent Number: 5,368,434
[45] Date of Patent: Nov. 29, 1994

[54] SELF-PROPELLED STRADDLE CARRIER

[75] Inventors: Edward S. Kress, Brimfield; Dennis R. Thomas, Peoria; Michael A. Rabas, Bishop Hill, all of Ill.

[73] Assignee: Kress Corporation, Brimfield, Ill.

[21] Appl. No.: 55,815

[22] Filed: Apr. 30, 1993

[51] Int. Cl.⁵ .................................................. B60P 3/00
[52] U.S. Cl. .................................... 414/460; 180/140; 280/6.12; 280/91; 280/709
[58] Field of Search ........................ 414/458–461; 280/6.12, 709, 91, 99; 180/140, 234

[56] References Cited

U.S. PATENT DOCUMENTS

| | | | |
|---|---|---|---|
| 2,274,821 | 3/1942 | Bloxsom | 280/91 |
| 2,959,310 | 11/1960 | Meister, Jr. | 414/459 |
| 3,387,726 | 6/1968 | McKee et al. | 414/458 |
| 3,655,081 | 4/1972 | Monk | 414/460 |
| 3,834,568 | 9/1974 | Larson et al. | 414/458 X |
| 3,856,102 | 12/1974 | Queen | 280/91 X |
| 4,152,004 | 5/1979 | Schröder | 280/6.12 X |
| 4,263,979 | 4/1981 | Sturgill | 280/91 X |
| 4,269,560 | 5/1981 | Thomas | 414/459 |
| 4,488,848 | 12/1984 | Kress et al. | 414/460 |
| 4,595,069 | 6/1986 | Oswald et al. | 280/6.12 X |
| 4,601,630 | 7/1986 | Kress et al. | 414/460 |
| 4,823,899 | 4/1989 | Ron | 280/91 X |
| 5,194,851 | 3/1993 | Kraning et al. | 280/91 X |

FOREIGN PATENT DOCUMENTS 1456917 10/1969 Germany ............................. 414/460
1406121 9/1975 United Kingdom ................. 414/459

Primary Examiner—David A. Bucci
Attorney, Agent, or Firm—Leydig, Voit & Mayer, Ltd.

[57] ABSTRACT

A self-propelled straddle carrier for straddling, lifting, supporting and carrying heavy loads directly under the structure of the vehicle. A main frame including a pair of spaced-apart, longitudinally extending side beams and arch-shaped cross beams is supported on wheels and strut assemblies. The interior sides of the wheels, strut assemblies, side beams and the cross beams form a tunnel-shaped load carrying space defining the inner envelope of the carrier, while their exterior sides define the outer envelope of the carrier. A tong assembly, including a tong actuator and a pair of depending tongs is suspended from the main frame for vertical movement up and down in the tunnel-shaped load carrying space. All components are removable from the tunnel for straddling loads, yet remain within the outer envelope during normal transport. Additionally, a steering system utilizing gear pumps designed for supplying hydraulic fluid to the head and rod ends of the steering cylinders in the same ratio of volumetric flows as the ratio of effective internal areas of the respective head and rod ends of the steering cylinders is provided for the vehicle, and a stabilization system is provided to stabilize the tong assembly when transporting a load.

44 Claims, 12 Drawing Sheets

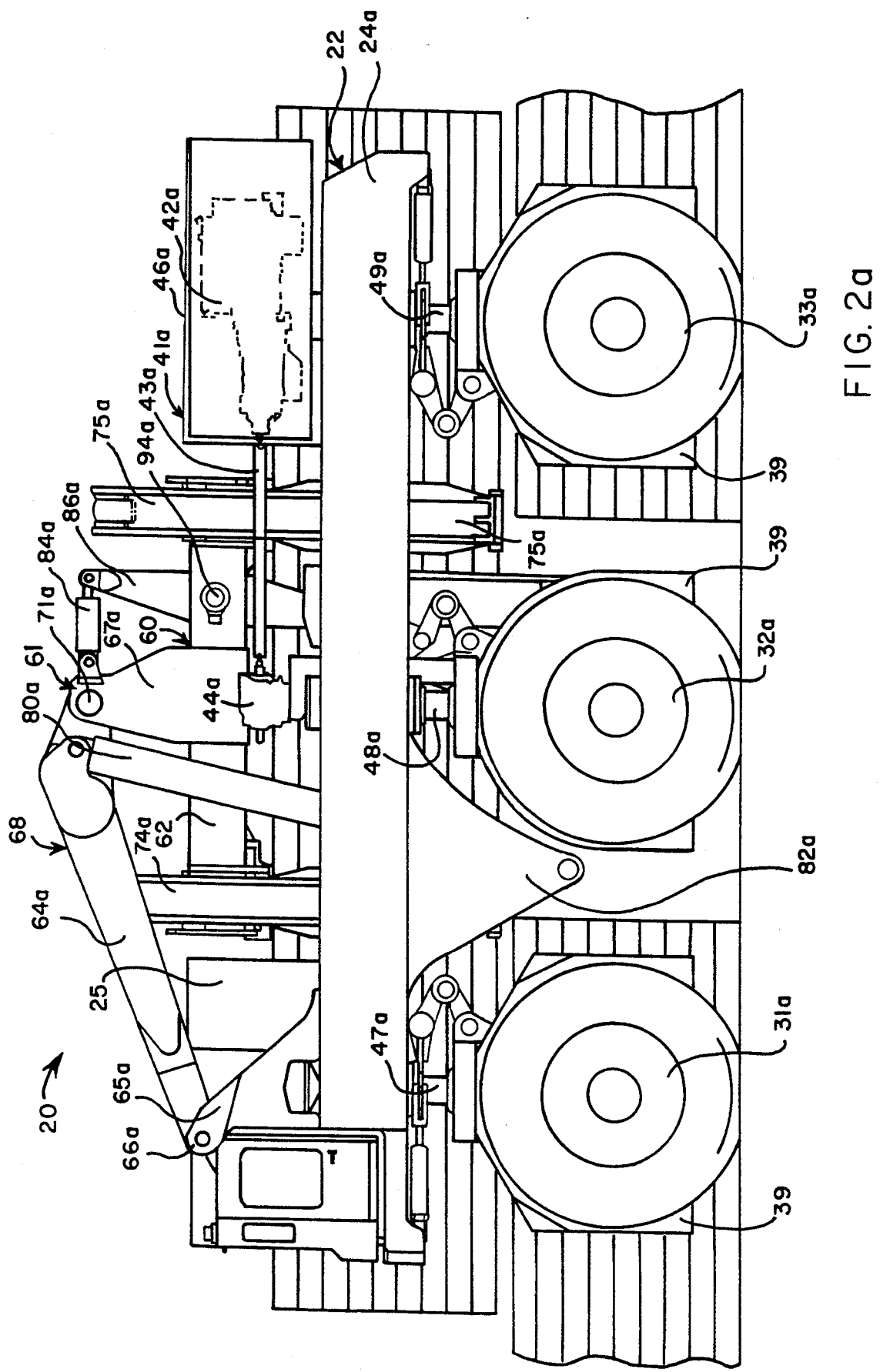

SELF-PROPELLED STRADDLE CARRIER

FIELD OF THE INVENTION

The present invention relates generally to a vehicle for carrying heavy loads, and more particularly to a vehicle for straddling, lifting, supporting and carrying heavy loads directly under the structure of the vehicle.

BACKGROUND OF THE INVENTION

U.S. Pat. No. 4,488,848 to Kress et al. and assigned to the assignee herein, is directed to a tractor-trailer apparatus having a vertically displaceable hydraulic tong mechanism incorporated in the trailer section for clamping and lifting a straddled load. While this apparatus functions well in certain environments, it is often limited because the bottom of the tractor and a stabilizing link beneath the front of the trailer portion are relatively close to the ground, and because the tractor wheels are narrowly spaced. As a result, to use this apparatus with loads of any substantial height relative to the apparatus, the rear portion of the tractor-trailer must be backed over the load. However, at times it is desirable to be able to drive over a stacked load in either direction; thus such a tractor-trailer apparatus is unsuitable for certain tasks.

Moreover, since the bottom of the lifting vehicle cannot clear loads above a certain height, stacked loads positioned for storage must be arranged to allow these load handling vehicles unencumbered access from either direction. Such a requirement limits flexibility as to the location and pattern of storing loads. However, for a vehicle to provide a substantial amount of flexibility while being designed to vertically clear loads of a relatively large height, the vehicle must be within an envelope having a relatively low and narrow profile and be highly maneuverable. In other words, such a vehicle must be able to minimize its overall height when traveling through narrow and low doorways and other overhead obstructions.

OBJECTS AND SUMMARY OF THE INVENTION

Accordingly, it is an object of the present invention to provide an apparatus for lifting, supporting and transporting heavy loads that can be driven in any direction over a load of relatively substantial height to straddle the load.

Another object of the invention is to provide an apparatus as characterized above that incorporates a drive train within the apparatus so that the apparatus is a self-propelled vehicle.

Another object of the invention is to provide a vehicle of the above kind that can be driven in any direction over a load of relatively substantial height while carrying a load of similar height and having the capacity to stack the carried load atop the load below.

Another object of the invention is to provide a vehicle as characterized above that has a relatively narrow envelope, yet can pass beneath a relatively low overhead obstruction.

A further object of the invention is to provide a vehicle of the above kind that is highly maneuverable.

Still another object of the invention is to provide a vehicle that maintains a constant load on all wheels substantially independent of the level of the terrain.

Another object of the invention is to incorporate a reliable standard vehicle steering system along with an electronic monitoring and adjustment system for making fine alignment adjustments to improve the performance of the vehicle while reducing stress on the vehicle and reducing tire wear.

Briefly, the present invention provides a self-propelled straddle carrier comprising a main frame including a pair of spaced-apart, longitudinally extending side beams and at least one arch-shaped cross beam. The cross beam has a generally horizontally extending central portion and downwardly depending legs rigidly connected to the side beams.

The main frame is supported upon a plurality of wheels with at least two wheels on each the disposed substantially directly under each of the side beams. The wheels are connected to said side beams by substantially vertically extending strut assemblies. Taken together, the interior sides of the wheels, strut assemblies, side beams and the cross beam form a substantially tunnel-shaped load carrying space defining the inner envelope of the carrier. The exterior sides of the wheels, side beams and cross beam define substantially the maximum vertical clearance profile and maximum lateral clearance profile, thus forming the outer envelope of the carrier.

A tong assembly, including at least one tong actuator and a pair of depending tongs for gripping and carrying a load in the tunnel-shaped load carrying space, is suspended from the main frame for vertical movement up and down between the side beams. Lift means connecting the main frame to the tong assembly are disposed within the vertical profile when the tong assembly is lowered. Propulsion means, including at least one engine and drive train are also connected to at least one of the wheels for reversibly driving the carrier. The propulsion means are mounted on the main frame, also substantially within the space between the inner and outer envelopes of the carrier.

The straddle carrier can further include means for steering at least the front pair of wheels relative to the main frame. The steering means includes a hydraulic actuator, comprising a cylinder having a head end and a rod end for extending and retracting a piston and a piston rod mechanically coupled to each of the steerable wheels such that the extension of each piston rod turns the corresponding wheel in one direction relative to the main frame and the retraction of the piston rod turns the corresponding wheel in an opposite direction relative to the main frame.

Means, including an operator controlled valve are provided for selectively supplying and discharging hydraulic fluid from the head ends and the rod ends of the cylinders. The supply and discharge means include fluid flow proportioning means for controlling the ratio of volumetric fluid flow to or from the head ends to the volumetric flow to or from the rod ends substantially equal to the ratio of the effective internal cross sectional area of the head ends to the rod ends of the cylinders.

The straddle carrier can further be provided with stabilizing means for controlling the orientation of the tong assembly including a tong support frame. The stabilizing means includes a stabilizing member pivotally mounted on each side of the tong support frame, and projects upwardly and downwardly therefrom. A guide channel secured to the inside of each of the side beams receives and guides the lower end of the stabilizing member as the tong frame is raised and lowered. A fluid actuator interconnects the upper end of each of the stabilizer members and the lift frame for maintaining the tong support frame substantially level, and for selectively controlling the tilt of the tong support frame.

Other objects and advantages will become apparent from the following detailed description when taken in conjunction with drawings, in which:

BRIEF DESCRIPTION OF THE DRAWINGS

FIG. 2a is a side elevational view illustrating the vehicle lifting a load over another load with its lifting mechanism in a raised position;

FIG. 2b is a front view of FIG. 2a;

Figure 1:
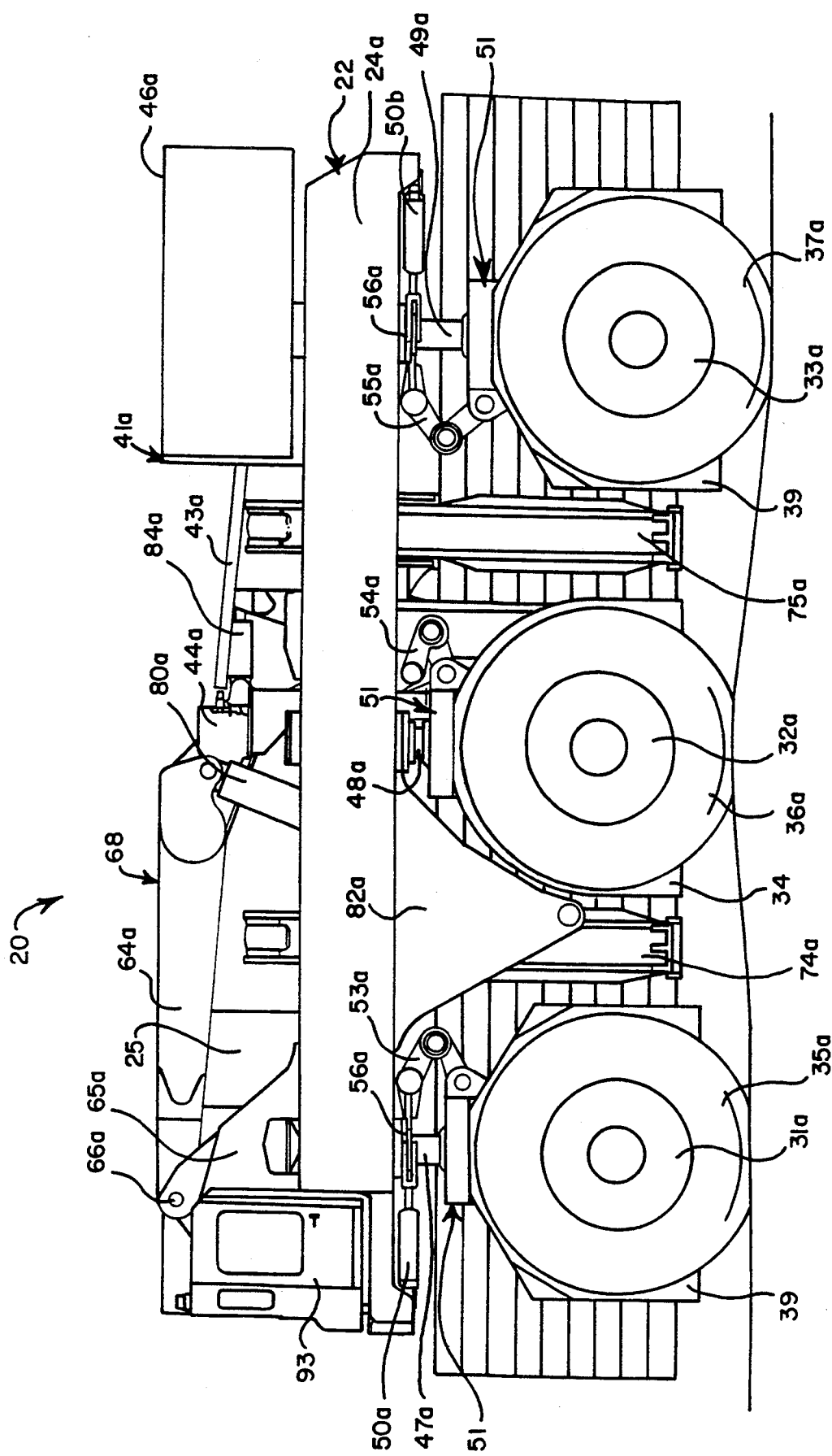
FIG. 1 is a side elevational view illustrating the vehicle transporting a load with its lifting mechanism in a lowered position.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Turning to FIGS. 1-4 of the drawings, there is shown a straddle carrier vehicle generally designated 20 having an overall tunnel-like structure extending lengthwise therethrough. Accordingly, loads of a relatively substantial height can be driven over and straddled from either direction. For ease of understanding herein, components, subassemblies and the like which have a symmetrical counterpart on an opposite side are numbered such that from the perspective of the driver (i.e. looking forward from the cab) the left side is denoted by the lower case letter "a" and the right side by the lower case "b."

In accordance with one aspect of the invention, to form the general tunnel structure the vehicle 20 includes a main frame 22 comprising a pair of laterally spaced apart box-type side beams 24a and 24b extending longitudinally substantially over the entire length of the vehicle, and a pair of transverse arched cross beams 25 (front) and 26 (rear) mounted near the ends of the side beams 24a and 24b extending substantially across the entire width of the vehicle 20. The longitudinally extending side beams 24a and 24b, (and consequently the main frame 22), are supported by a plurality of wheels 31a-33a and 31b-33b which ordinarily include conventional air-inflated tires 35a-37a and 35b-37b mounted thereon. Accordingly, when viewed from the front to the rear as in FIG. 4, the tires define the lower sidewalls of a longitudinally extending tunnel, while the upper portion of the tunnel is defined by the main frame 22. Thus, the overall height of the tunnel depends in part on the diameter of the tires and in part on the height of the arched crossbeams 25 and 26. Although not necessary to the invention, internal fender structures 39 are preferably provided (as part of strut assemblies 51 described hereinbelow) to protect and guard each wheel from the typically hot steel slabs or billets to be carried. Thus, the fender structures 39 actually form the inner walls of the lower tunnel portion.

In keeping with the invention, the vehicle incorporates a self-contained propulsion means such as a pair of drive trains 41a and 41b disposed essentially outside of the tunnel structure, yet within the envelope (vertically and horizontally) defined by the main frame 22. This enables the vehicle 20 to be self-propelled so that the vehicle 20 does not have to be towed by a tractor, since towing would essentially defeat the bi-directional straddling capability that results from the general tunnel shape. To this end, the propulsion means is preferably disposed atop the longitudinally extending side beams 24a and 24b, i.e., outside of the tunnel but within the envelope.

Figure 5:
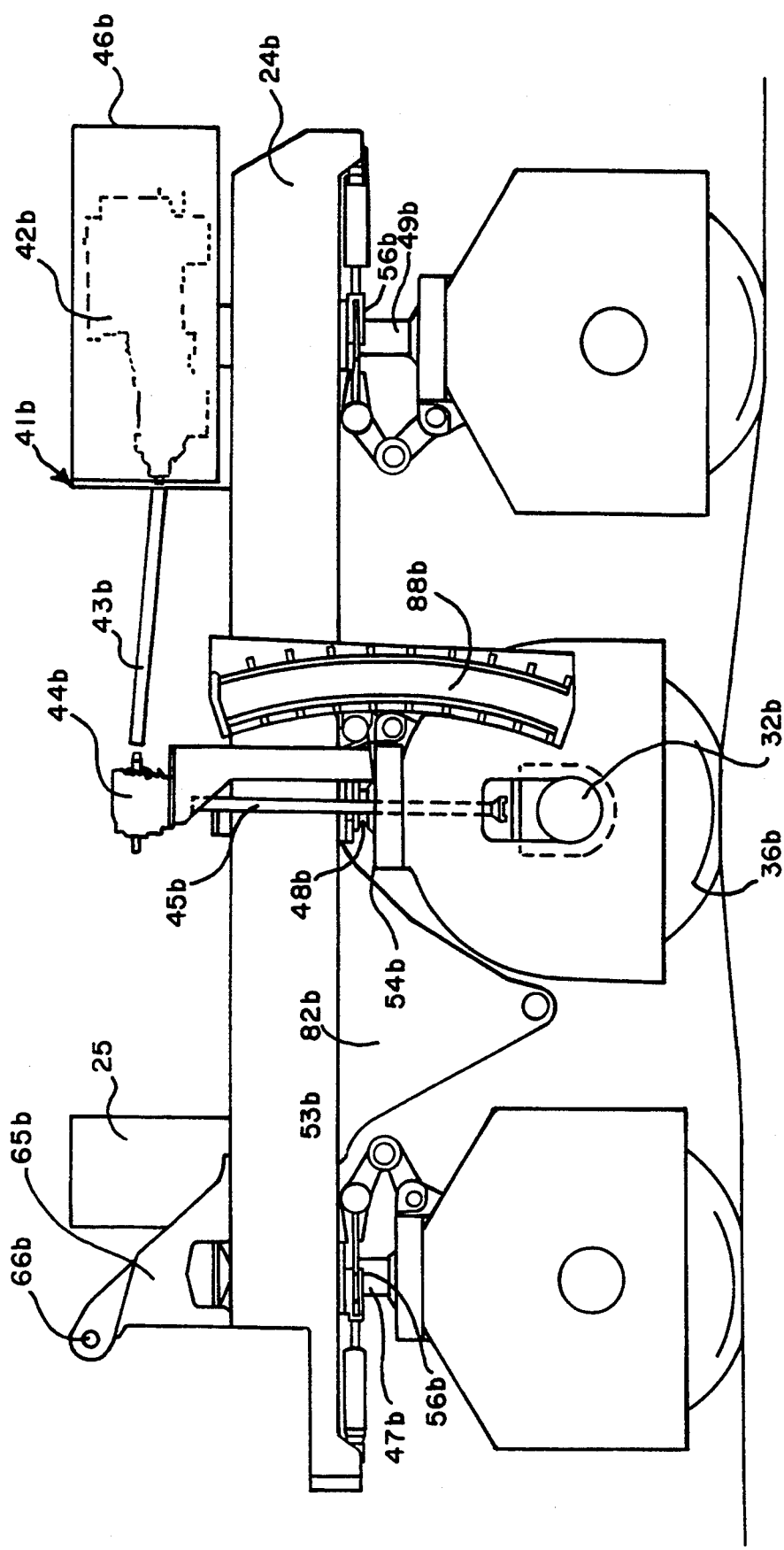
FIG. 5 is an inside view of the right side of the vehicle.

As best shown in FIG. 5, the drive trains 41a and 41b include a right-side engine 42b mounted atop the rear portion of the longitudinally extending side beam 24b. Although not necessary to the invention, it can be readily appreciated that a counterpart engine is similarly mounted on the left side. Ordinarily, these engines 42a and 42b are protected by corresponding housings 46a and 46b. As further shown in the inside right side view of FIG. 5, the engines 42a and 42b are mechanically coupled by drive shafts 43a and 43b to a pair of right-angle upper gearing mechanisms 44a and 44b respectively. As also best shown in FIG. 5, these gearing mechanisms are further mechanically coupled to their respective center wheels 32a and 32b again through appropriate shafts such as right-side shaft 45b and right-angle lower gearing mechanisms (not shown). Thus, the vehicle is propelled as the engines 42a and 42b rotate the drive shafts to drive the center wheels 32a and 32b. Ordinarily, a conventional transmission system is also employed to provide for forward and reverse drive and also to control the ratio of engine speed to drive shaft speed. Moreover, if desired, the drive trains can be coupled together, for example by sharing a common throttle system so that the left center wheel 32a is not driven at substantially different speeds than the right center wheel 32b under ordinary circumstances. Of course, it can readily be appreciated that other propulsion means, for example hydrostatic drives, can alternatively be utilized to propel the vehicle.

Figure 11:
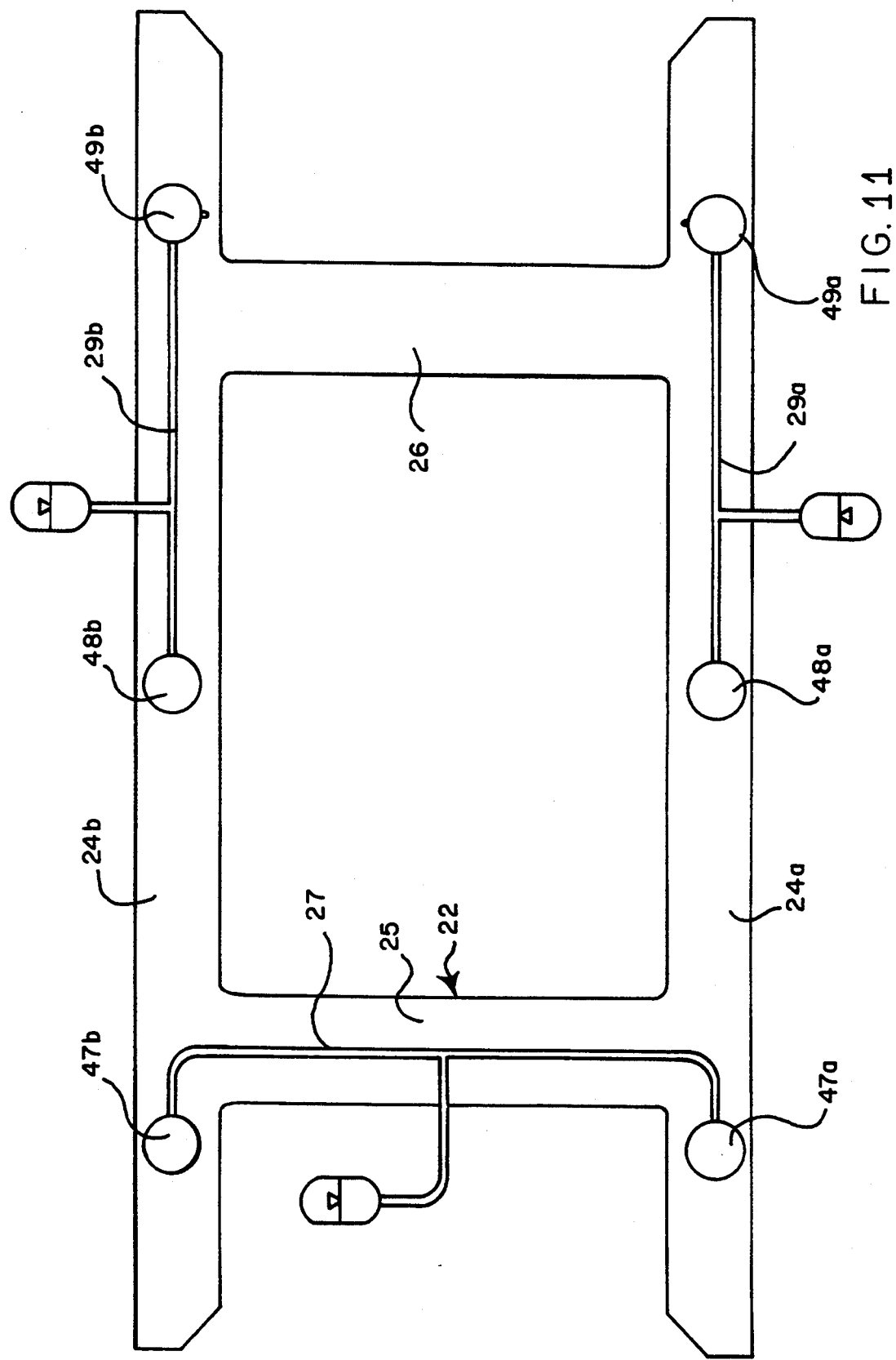
FIG. 11 is a top plan view diagraming the preferred hydraulic fluid distribution system for the strut assemblies.

To assist in keeping the wheels of the vehicle 20 equally loaded over uneven terrain, thereby equalizing the stress in the vehicle, all of the wheels 31a-33a and 31b-33b individually support the main frame 22 though vertical lineal actuating struts 47a-49a and 47b-49b. To maintain the equal loading (i.e., provide a three point support system), the front two wheels 31a and 31b share a common hydraulic system 27 as shown in FIG. 11. The system 27 operates to balance the front wheels 31a and 31b when one front wheel (for example right front wheel 31a) is pushed by higher terrain toward the main frame 22. The pushing force is translated to a fluid pressure in the left strut 47a for extending the right strut 47b (and consequently the right front wheel 31b) such that the front wheels effectively act as the front support point in the three point support system. For the left rear support point, the left side center wheel 32a and rear wheel 33a are similarly hydraulically coupled via hydraulic system 29a for struts 48a and 49a. Similarly, the left rear support point is provided by balancing the right side center wheel 32b and rear wheel 33b through struts 48b and 49b sharing hydraulic system 29b.

In short, the sum of the total extensions of the front pair of struts 47a and 47b remains constant, as does the left-side center and rear pair and right-side center and rear pair, since as each strut is compressed the others are extended by the increased pressure such that a balance is always achieved.

For example, as shown in FIG. 1 the raised terrain pushes the center tire 36a upward, while the terrain is lower under tire 37a. Accordingly, the strut 48a is compressed while strut 49a is proportionally extended. The main frame 22 thereby remains longitudinally level regardless of the grade of the underlying terrain (within a limit defined by the maximum vertical displacement of the struts). As a result, the weight of the vehicle 20 plus the load weight is evenly distributed over each of the supporting tires. Of course, the vertically descending drive shafts 45a and 45b (see FIG. 5) and associated gearing mechanisms must be designed to adapt to extensions and compressions of the center struts 48a and 48b for the wheels 32a and 32b (i.e., tires 36a and 36b). For example, in one embodiment the vertical shaft 48b and its associated gearing mechanism 44b are vertically displaceable as the wheel 32b moves vertically while the shaft 43b changes its angle relative to the side beam 24b to compensate for the up-and-down movements. In other embodiments, the shaft 45b adjusts in a telescoping manner to extensions and compressions of strut 48b.

In keeping with the invention, because the vehicle is not configured as a tractor-trailer apparatus, the vehicle 20 includes an entirely self-contained steering system to allow the operator steering capability. To maximize maneuverability, the preferred embodiment employs a four-wheel hydraulic steering system connected to the front and rear wheels. To this end, strut assemblies 51 (which may include L-shaped arms and the fenders 39) are coupled at one end to the axles of the front wheels 31a and 31b and are rigidly connected at their other ends to lower members of the individual scissors links 53a and 53b. The upper members of the scissors links 53a and 53b are in turn connected to individual collars 56a and 56b rotatably connected to the main frame 22 and further connected to angled hydraulic steering cylinders 50a and 50b respectively. Since four-wheel steering is employed in the preferred embodiment, the rear wheels 33a and 33b are identically scissors coupled (via scissors links 55a and 55b) ultimately to similar angled hydraulic steering cylinders 52a and 52b. The scissors links are utilized to allow for the vertical leveling movement of the wheels relative to the main frame 22 as described hereinbefore. Additionally, since the center wheels 32a and 32b do not turn left or right, scissors links 54a and 54b couple the center wheel axles to the main frame 22 to prevent their turning while allowing vertical movement.

Figure 3:
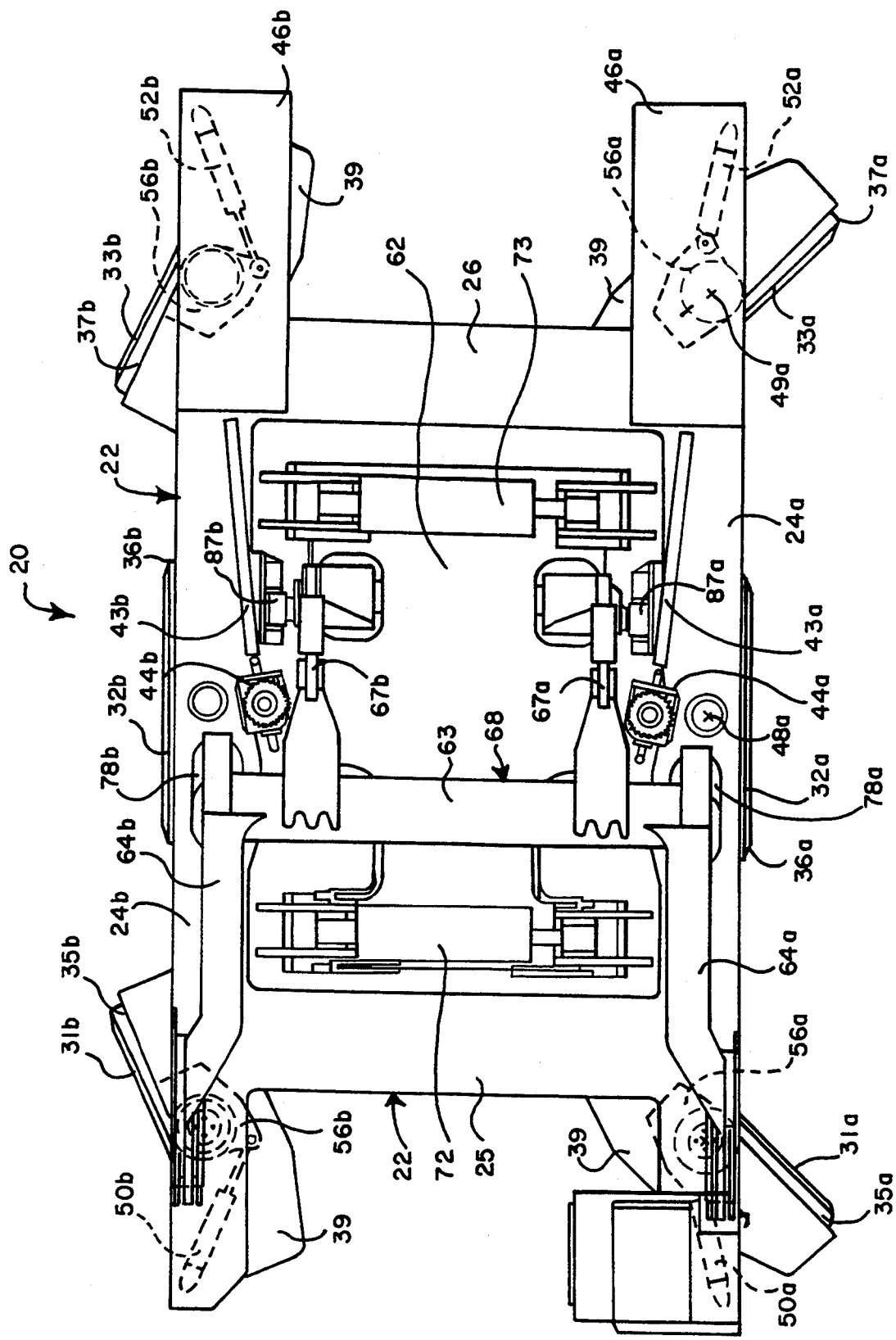
FIG. 3 is a top plan view of the vehicle in a left turning position.

As best shown in FIG. 3, due to their angled orientation, by appropriately extending and retracting front hydraulic steering cylinders 50a and 50b and rear steering cylinders 52a and 52b, the corresponding collars and scissors links are pushed towards the center of the vehicle or pulled in the opposite direction. This turns the strut assemblies 51, thereby turning the wheels, as well as the fender structures 39 which are preferably included with the strut assemblies 51. Thus steering is accomplished by appropriately controlling the cylinders 50a–50b and 52a–52b.

To operate the cylinders, means, including an operator controlled valve are provided for selectively supplying and discharging hydraulic fluid from the head ends and the rod ends of the cylinders. The supply and discharge means include fluid flow proportioning means for controlling the ratio of volumetric fluid flow to or from the head ends to the volumetric flow to or from the rod ends substantially equal to the ratio of the effective internal cross sectional area of the head ends to the rod ends of the cylinders.

Figure 6:
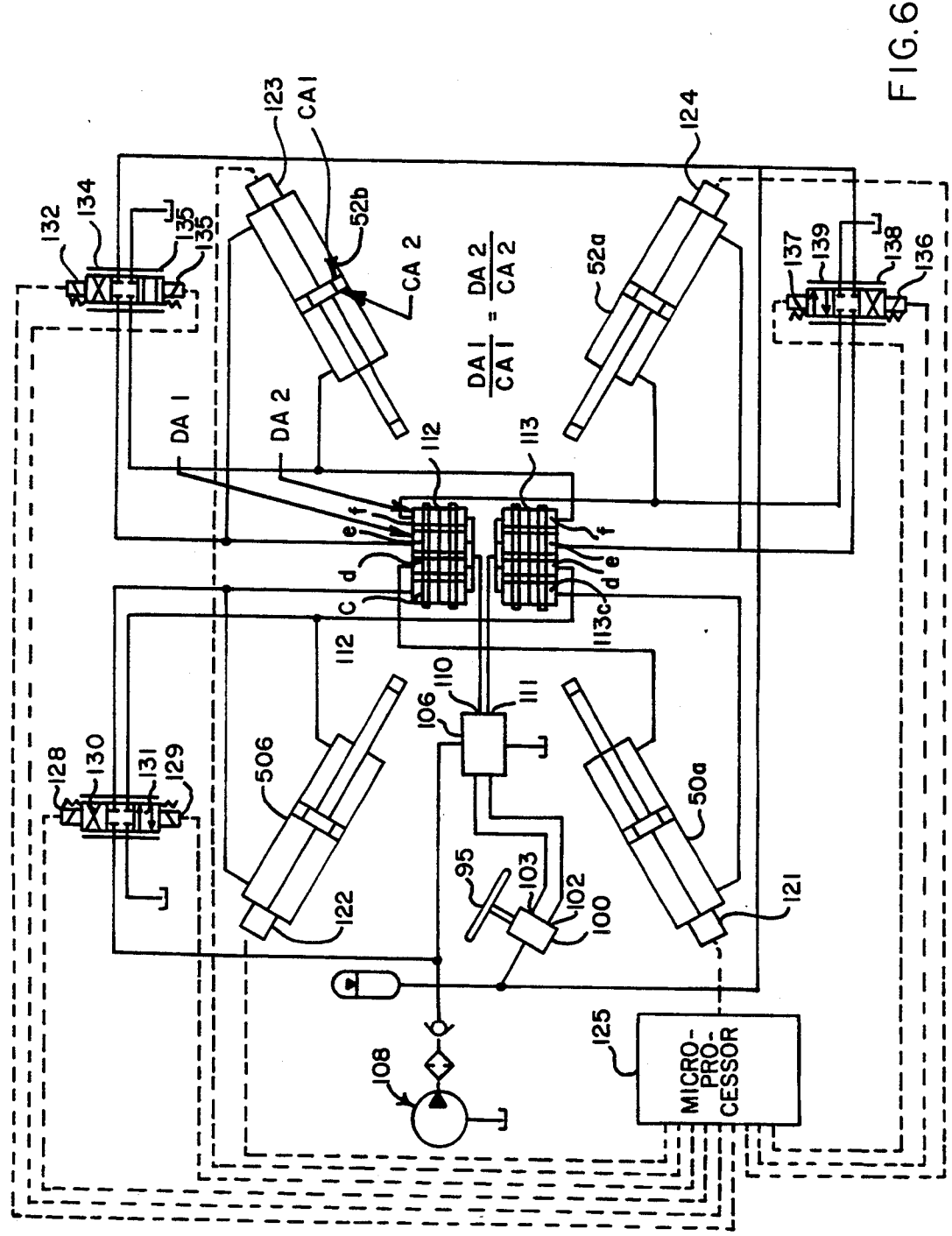
FIG. 6 is a diagram illustrating the hydraulic steering system of the vehicle.

To ensure proper and reliable control of the cylinders for steering, in the preferred embodiment the hydraulic steering system of FIG. 6 has been employed. As the operator turns the steering wheel 95 located in the cab 93, a hand metering unit 100 delivers a specific amount of fluid (oil) from a high pressure source 108 to either the left port 102 or the right port 103 in dependence upon the direction turned. The amount of fluid delivered is ordinarily proportional to the amount of the movement of the steering wheel 95. This pressurized fluid proceeds through a flow amplifier valve 106 which is also connected to the high pressure fluid source 108 such as a conventional pumping system. In the conventional manner, the metered control fluid combines with the pumped high pressure fluid at a predetermined ratio. For example, in one embodiment the amplifier 106 provides an output flow that is twenty times greater than the original volume of control fluid delivered by the hand metering unit 100. The high pressure fluid exits the flow amplifier valve through either a left port 110 or right port 111, again in dependence on the direction and amount of steering wheel movement.

Assuming for example that the fluid flows through the left port 110 (i.e., left turn), the highly pressurized fluid then proceeds to a corresponding first flow divider 112, which splits the fluid proportionally to the four steering cylinders 50a–50b and 52a–52b. Two of the cylinders receive the fluid at their rod ends to retract the pistons, while two receive the fluid at their head ends to extend the pistons. For example, when making a left turn as in FIG. 3, the right front cylinder 50b and right rear cylinder 52b are connected to the high pressure fluid so as to be extended, while the left cylinders 50a and 52a are connected to the fluid so as to be retracted in amounts depending on the amount of fluid flow. Of course, the exiting fluid pressure is lower since the open side of the cylinders flows back to a tank.

According to one aspect of the invention, since the head end of the cylinder has a greater surface area for fluid pressure than the rod end (due to the piston dimensions), the ratio of the area of the head side flow divider section DA1 to the area of the head end of the cylinder CA1 is proportional to the area of the cylinder rod side flow divider section DA2 to the cylinder rod side area CA2.

At the end of each cylinder not receiving high pressure fluid, the fluid therein is pushed out and recombined at a second flow divider/combiner 113 utilized as a flow combiner. It can be readily appreciated that alternate ones of the flow dividers/combiners serve as flow combiners depending on the direction of fluid flow, i.e, during a right turn the first flow divider/combiner 112 is employed as a fluid combiner while the second flow divider/combiner 113 utilized as a flow divider. Using such a flow divider as a combined on returning fluid keeps the steering cylinders from freely changing position when steering, in the likelihood that each cylinder is at a different pressure. Check valves (for the left front steering cylinder) and counter-balance valves (for the other steering cylinders) are preferably connected to the head end and rod of each cylinder to prevent the flow divider (either flow divider/combiner 112 or 113) from locking up when the flow divider is used as a flow combiner.

It can be appreciated that wheels often encounter different resistances when turning. For example, one wheel might come into contact with a curb or other such obstruction. Since the preferred embodiment employs four wheel steering that is operated without any common wheel axles, the flow dividers and combiners must adapt to the different forces. To this end, two pairs of four coaxial gear sets, or pumps, 112c, d, e and f and 113c, d, e and f have been employed to operate as the flow dividers and combiners 112 and 113 for the cylinders. These operate as intensifiers such that as one wheel encounters resistance, the fluid pressure is increased to that wheel and reduced to the others. As discussed before, the areas of the flow dividers have been matched to the areas of the rod ends and head ends of the cylinders. In the preferred embodiment, two of the gears c and e in each of the gear sets 112c–f and 113c–f are of a first width and the other two gears d and f are of a second width and the ratio of the first widths to the second widths is equal to the ratio of the effective internal areas of the head end of a corresponding cylinder to the rod end of the corresponding cylinder. Thus, the piston rods are always extended and retracted the same amount due to the proportional flow regardless of which ends of the cylinders are pressurized or the resistance encountered.

In any case, once movement of the steering cylinders occurs, the wheels of the vehicle 20 will begin to turn as described hereinbefore. Because of the geometry of the steering system and because of possible fluid leakage, an electro-hydraulic system is utilized to monitor the position of each of the cylinders and make minor adjustments as required. To this end, the system monitors one of the cylinders selected as a lead cylinder (for example steering cylinder 50a) using a first linear transducer 121 to measure the displacement of its piston. Preferably, the cylinder beneath the cab is chosen as the lead cylinder, i.e., either the front left or front right cylinder depending on where the cab is located. In any case, the measurement from the linear transducer 121 is fed to a microprocessor 125. The microprocessor 125 then similarly monitors the piston positions of the remaining cylinders based on signals from transducers 122-124, and makes a series of calculations to determine if any adjustments are required to optimally adjust (i.e., fine tune) the cylinders relative to the lead cylinder in a predetermined manner.

If adjustments to these other cylinder piston lengths are required, a signal is sent by the microprocessor 125 to an appropriate adjustment means including solenoids 128 or 129 and proportional directional valves 130 or 131 for cylinder 50b. For example, this signal causes the directional valve 130 to meter pressurized oil from the high pressure source 108 into the head end of the cylinder causing the piston therein to extend. Conversely, sending a signal to solenoid 129 will cause the proportional directional valve 131 to meter pressurized oil into the rod end, causing the piston to retract.

When the proper length of the cylinder is obtained, the microprocessor 125 then stops providing the signals to the appropriate solenoid (128 or 129) thereby stopping the flow through the corresponding directional valve. The other cylinders 52b and 52a are adjusted in an identical manner by operating solenoids and valves 132-135 and 136-139 respectively.

It can be readily appreciated that by properly arranging and controlling the steering cylinders 50a–50b and 52a–52b, each of the axles of the wheels can be made to point to a common point during turning operations, i.e., Ackerman steering can be accomplished. For example, during a left turn, the right-side, or outside wheels are preferably turned an amount that is less, relative to the main frame 22, than the left-side, or inside wheels. As is well-known in the art, this produces even wear on the tires. It should also be noted that although the electrical system is employed, it is preferable to only allow the electrical system to make fine adjustment operations in this manner so that if the electrical system malfunctions, the driver still maintains control of the vehicle.

Turning now to a consideration of the system for raising and lowering a straddled load, the main frame 22 carries a single load lifting and carrying assembly, i.e., tong assembly 60 that can be dropped into or lifted out of the tunnel as described hereinbefore. The function of this tong assembly 60 is to raise or lower a straddled load and to grip the load while the vehicle 20 is moving. As hereinafter described, the assembly 60 has the capacity of engaging the load and elevating it, lifting and carrying it either for a sorting and stacking operation or for maintaining ground clearance or clearance over another load during a transporting operation.

The tong assembly 60 includes a tong support frame 62 suspended by a pivoting yoke assembly 61 including upright members (i.e., yoke arms) 67a and 67b. The left and right upright members 67a and 67b of the yoke assembly 61 are pivotably connected at pivot points 71a and 71b to the displaceable ends of a U-shaped lift frame 68 comprising left and right longitudinally-extending lifting legs 64a and 64b connected together at their displaceable ends by a stabilizing crossbeam 63. The opposite ends of the lift frame legs 64a and 64b are pivoted to supports 65a and 65b, respectively, at transversely aligned points 66a and 66b. Thus, by elevating the lift frame 68, the yoke assembly 61 and consequently the tong support frame 62 is lifted.

Figure 7:
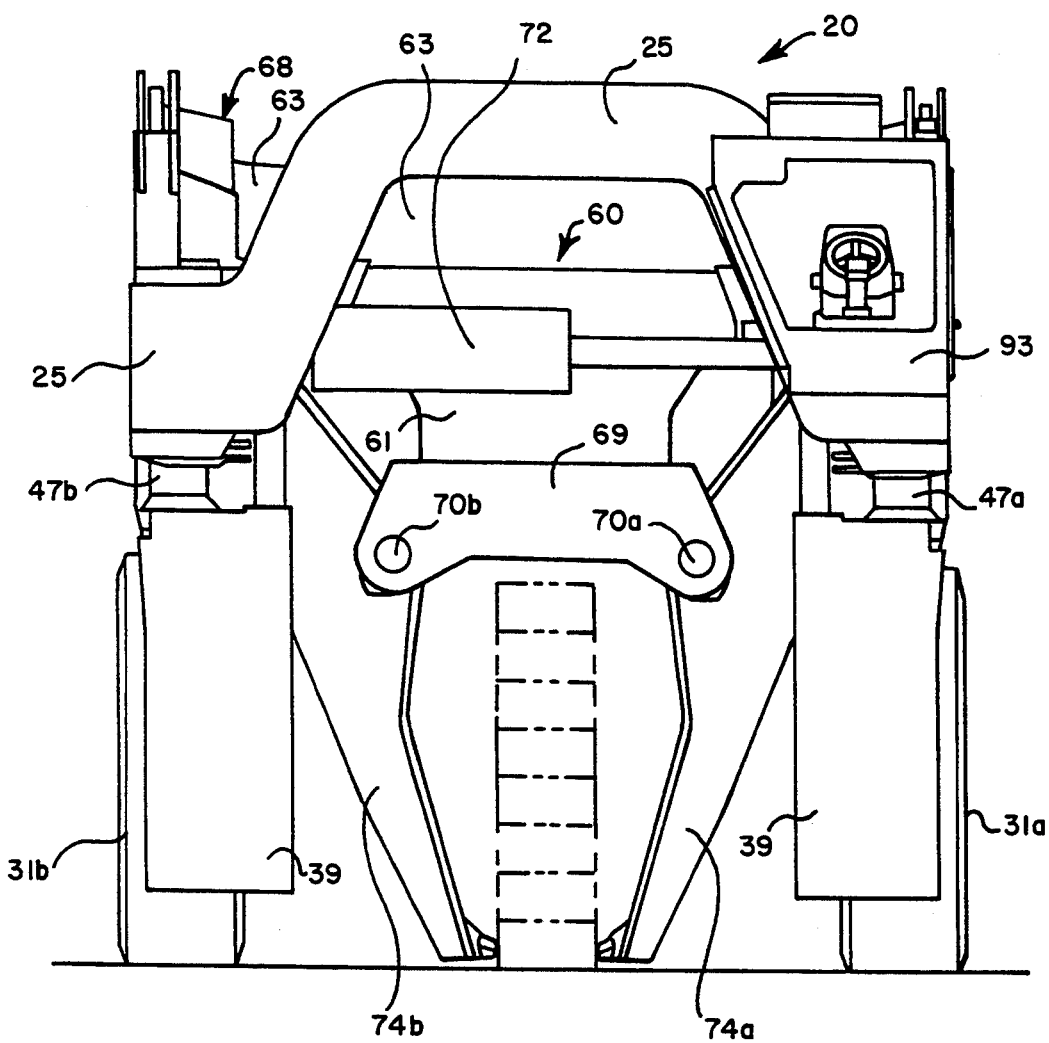
FIG. 7 is a front elevational view illustrating the vehicle clamping a load with its lifting mechanism in a lowered position.

Pivotably mounted at each end of the tong support frame 62 are two sets of substantially identical tongs. As shown in FIG. 7, the front set of tongs is comprised of two members 74a and 74b pivoted near their central portions at pins 70a and 70b to a front end 69 of the tong support frame 62.

The lower ends of the tongs are adapted to squeeze against and grip the load when the upper ends of the tongs members are forced apart by the action of a front tong assembly actuator, shown as an hydraulic clamping cylinder 72. It will be appreciated that rear tongs 75a and 75b are mounted and operated in a substantially identical manner in dependence on a counterpart rear actuating cylinder 73. It will also be appreciated that the specific configuration and numbers of the tongs can vary from that illustrated to suit a particular application depending upon the nature of the load, the size variations contemplated, the weight, and so on.

Turning now to a consideration of the system for raising and lowering the tong assembly 60 including yoke assembly 61 and the tong frame 62, and consequently, the tongs 74a14 74b and 75a–75b, a lift means is utilized for raising and lowering the tong assembly. Preferably, the lift means includes the U-shaped lift frame 68 connected at the lift frame legs 64a and 64b to accompanying lift actuators such as hydraulic lifting cylinders 80a and 80b. Since the lift frame 68 is in turn pivotably connected to the yoke assembly 61 at pivot points 71a and 71b, elevating the lift frame lifts the tong assembly 60 via the yoke assembly 61.

To obtain the necessary amount of vertical displacement of the lift frame 68 so that at the lowered position the tops of the lift frame legs 64a and 64b do not increase the height of the vehicle 20 and at the elevated position the tong assembly 60 is essentially outside of the tunnel, the lifting cylinders 80a and 80b are pivotally connected to supports 82a and 82b that are rigidly coupled beneath the main frame 22. The supports 82a and 82b are preferably V-shaped so as to maintain a large, strong coupling area with the longitudinal side beams 24a and 24b and simultaneously fit between the front and center wheels. In keeping with the invention, the lifting cylinders 80a and 80b and lift frame legs 64a and 64b are disposed substantially in the same vertical plane as the side beams 24a and 24b. To reach the lift frame, the lifting cylinders project through vertical openings 78a and 78b disposed in the longitudinally extending side beams 24a and 24b, respectively. As a result, since the lifting cylinders are not disposed inside the envelope defined by the side beams, the lifting cylinders 80a and 80b do not reduce the interior dimensions of the tunnel, and since the lifting cylinders are not disposed outside the beams, they stay within the envelope defined by the main frame 22. Additionally this feature protects the cylinders from damage which might result from coming into contact with a load or an external obstruction.

In the embodiment shown, the lifting cylinders 80a and 80b of the actuators are pivotally connected to the displaceable ends of the lift frame legs 64a and 64b, which are in turn pivotably connected to the yoke assembly 61. This arrangement permits, through the simultaneous extension or retraction of the lift cylinders 80a and 80b, the pivoting of the lift frame 68 (including legs 64a and 64b) and consequently the lifting or lowering of the yoke assembly 61 and connected tong frame 62 through the arc 91 shown in FIG. 8. The lifting cylinders 80a and 80b extend primarily in a vertical direction, although they are slightly angled since their lower ends are connected to the supports 82a and 82b between the front and center tires and the upper end is over the center tire so as to maximize their leverage on the lift frame legs which extend over the center tires. However, it will be appreciated that the sizes of the lifting cylinders 80a and 80b, as well as the specific points and methods of attachment to the main frame 22 and the lift frame 68 and can be varied to suit a particular application.

Figure 8:
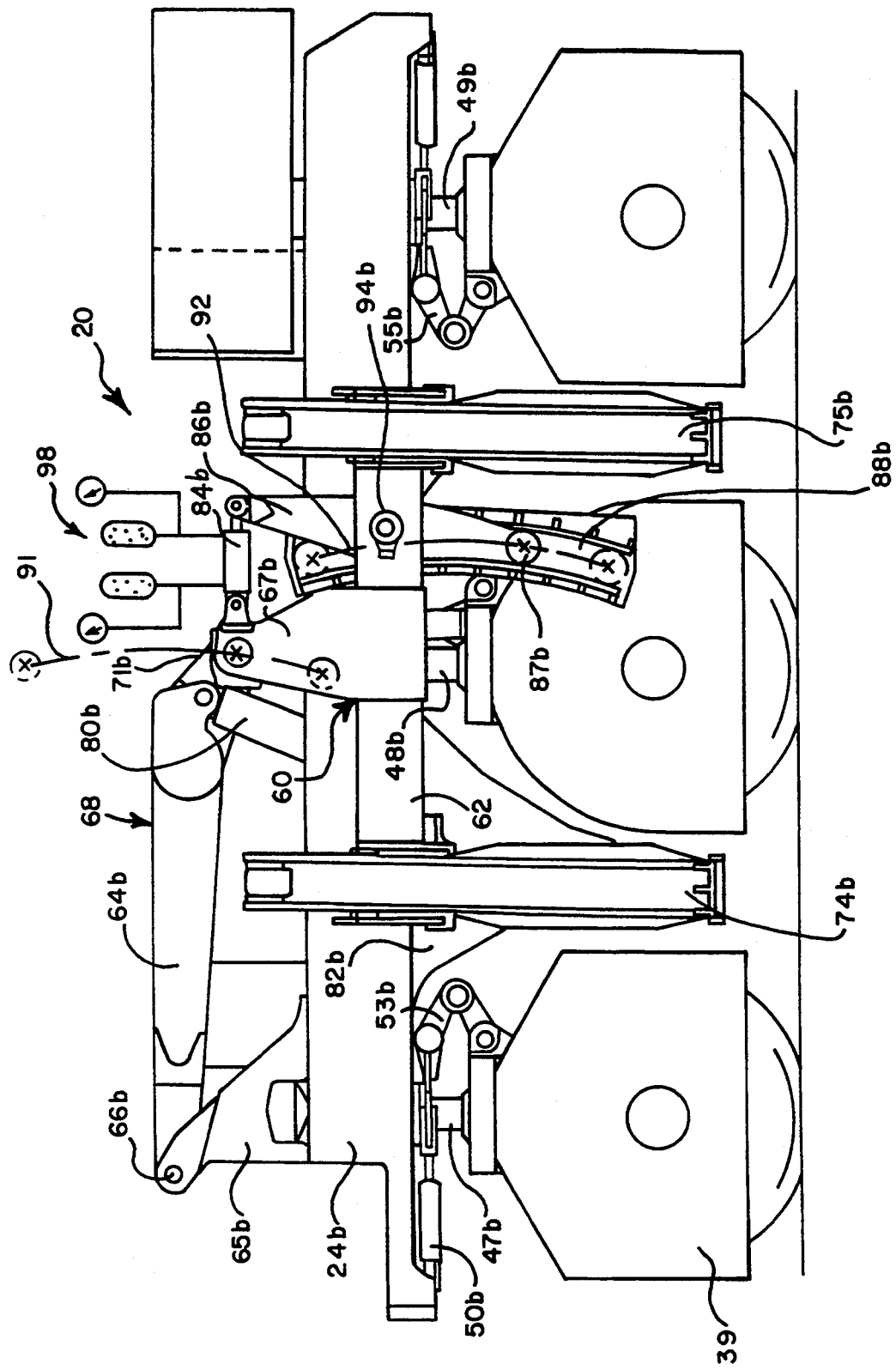
FIG. 8 is an inside view of the right side of the vehicle illustrating the tong assembly.

To stabilize the pivoting tong frame 62 from lateral or longitudinal movement, the yoke assembly 61 is pivotally connected on its upright members 67a and 67b to a stabilization means including pivotable stabilizing members 86a and 86b. As shown in FIG. 8, the upper end of the stabilization members 86a and 86b are preferably connected to the yoke assembly 61 through fluid actuators such as stabilizing cylinders 84a and 84b, while the lower ends of the stabilizing members 86a and 86b carry rollers 87a and 87b dimensioned to ride in guide channels 88a and 88b rigidly secured to the main frame. Additionally, the tong frame 62 is pivotably connected to the centers of the stabilizing members 86a and 86b at pins 94a and 94b. Accordingly, the channels allow primarily only vertical movement of the tong support frame 62; however, since the lift frame, yoke assembly and tong support frame 62, are lifted in an arcuate manner, the guide channels 88a and 88b are also arcuate so that the stabilizing cylinders 84a and 84b need not ordinarily be adjusted to keep the tong frame 62 level. In other words, the yoke assembly 61 and tong frame 62 also move in an arcuate manner represented by the broken line arc 92 in FIG. 8. In the preferred embodiment, the arc 91 traveled by the pivot points 71a and 71b of the yoke assembly 61 is substantially identical to the arc 92 of the arcuate guide channels 88a and 88b. Since the guide channels are fixed in the lateral direction, the stabilizing members 86a and 86b and their lower rollers 87a and 87b prevent any lateral movement of the tong frame 62.

Figure 4:
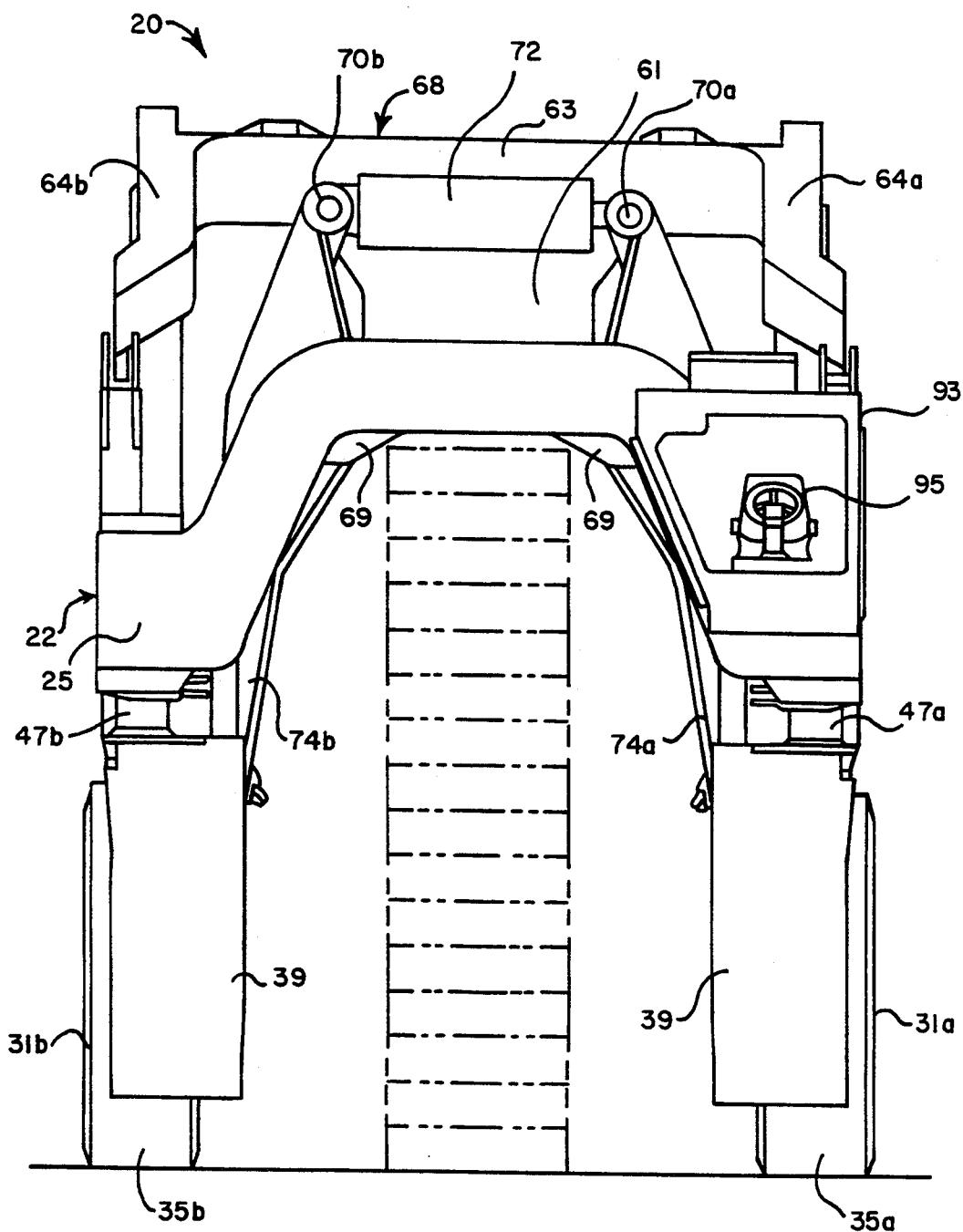
FIG. 4 is a front elevational view illustrating the vehicle passing over a load with its lifting mechanism in a raised position.

In operation, the vehicle 20 is driven over a load in any direction. According to the invention, this is possible due to the tunnel configuration of the vehicle. If the vehicle 20 is merely being driven to pass over the load, the operator need only raise the tong frame 62 sufficiently to clear the load. For example, if each slab in the illustrated loads is one foot high, to clear a sixteen foot load, the operator would have to operate the lifting cylinders 80a and 80b to lift the tong frame 62 as high as possible and open the tongs 74a–74b and 75a–75b, as shown in FIG. 4. In this example, since the height from the ground to the bottom of the arched crossbeams 34 and 35 defines the maximum height of a load that the vehicle can clear, (provided that the lifting mechanism is in its raised position), the dimensions of the exemplified vehicle are such that the vehicle can clear a load having a height of sixteen feet even though the maximum height of the vehicle is less than twenty-four feet above the ground level. Accordingly, due to its tunnel configuration the vehicle 20 clears a relatively substantial load height equal to approximately three-quarters of its absolute maximum height.

To clear an eight foot load, as shown in FIG. 7, the tunnel structure of the vehicle 20 obviates the need for the operator to even raise the lift assembly 60. Indeed, all that is necessary is that the operator open the tongs 74a–74b and 75a–75b. In this example, the vehicle 20 can straddle, lift and carry an eight foot load and simultaneously pass beneath a overhead obstruction just over eighteen feet high while the lift assembly 60 is in its normal transport position.

Figure 9:
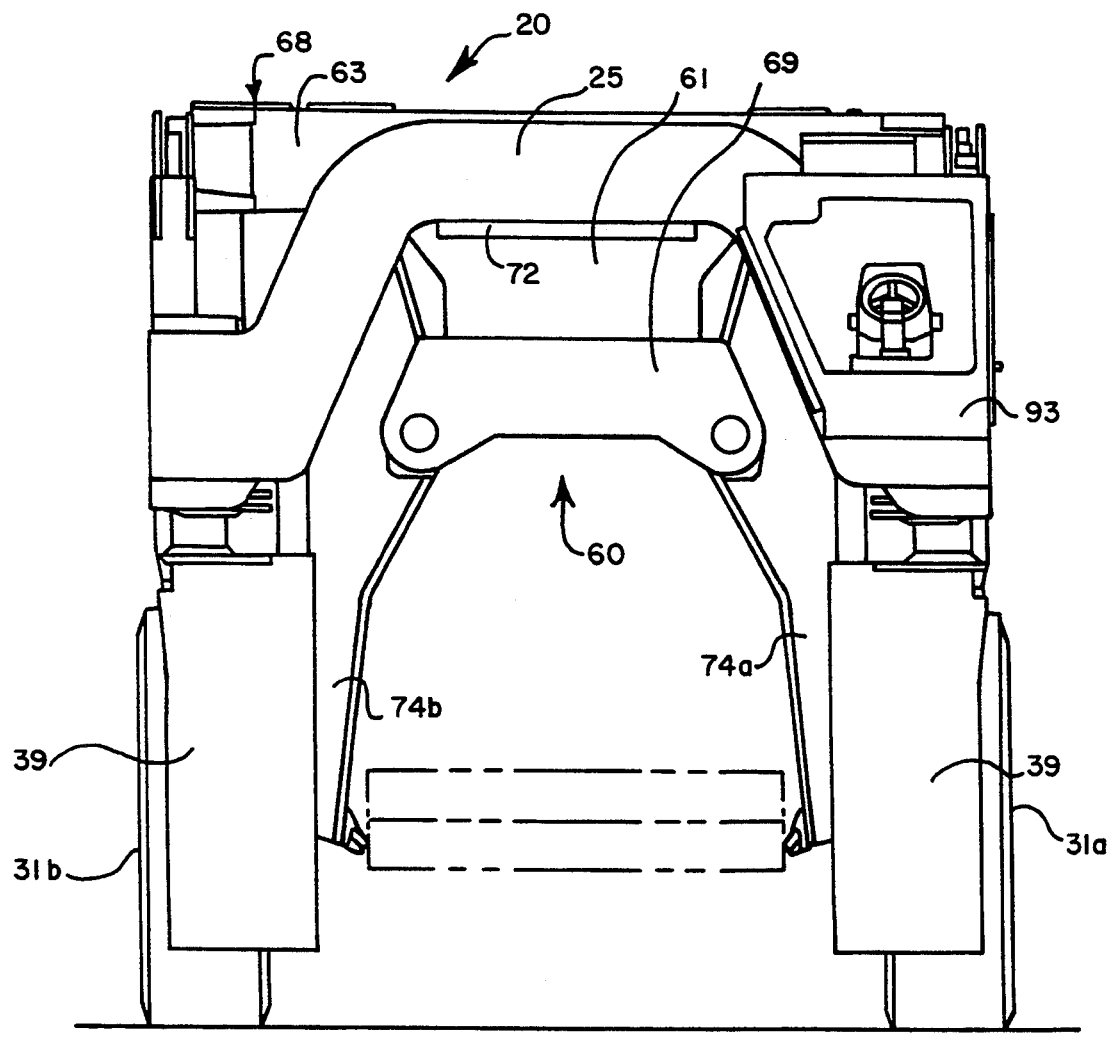
FIG. 9 is a front elevational view illustrating the vehicle lifting a clamped load with its lifting mechanism in a partially raised position.

To lift a load, the operator first verifies that the tongs 74a–74b and 75a–75b are opened and that the lift assembly 60 is high enough to clear the load, (and if not operates the appropriate cylinders accordingly), drives over the load to straddle it, and then lowers the lift assembly 60 by operating the lifting cylinders 80a and 80b as described hereinbefore. The operator then clamps the load between front tongs 74a–74b and rear tongs 75a–75b by actuating the tong actuators (cylinders) 72 and 73. The operator then lifts the lift assembly 60 so that the load is off of the ground a desired amount, for example, as shown in FIG. 9. As also shown in FIG. 9, its can be appreciated that the tongs adapt to loads of varying width.

As described before, as the tong frame 62 is lifted, the rollers 87a and 87b at the lower ends of the stabilizing members 86a and 86b ride in the guide channels 88a and 88b. Since the guide channels 88a and 88b are arcuate, (having the same arc 92 as the arc 91 traveled by the tong frame 62), the tong frame 62 and consequently the load remain generally level during the lifting operation. If however the load was not gripped evenly, for example the front and rear tongs are not equidistant from each of the ends of the load, the load may be off balance causing the pivotable tong frame 62 to tilt. To compensate, the stabilizing cylinders 84a and 84b are adjustable such that the tong frame 62, which is pivotably connected to the stabilizing members 86a and 86b, is leveled by appropriate extensions or retractions of their pistons. This is because the yoke assembly 61, which is rigidly connected to the tong frame 62, pivots at points 71a and 71b relative to the stabilizing members 86a and 86b during extensions or retractions of the stabilizing cylinders 84a and 84b.

Figure 2B:
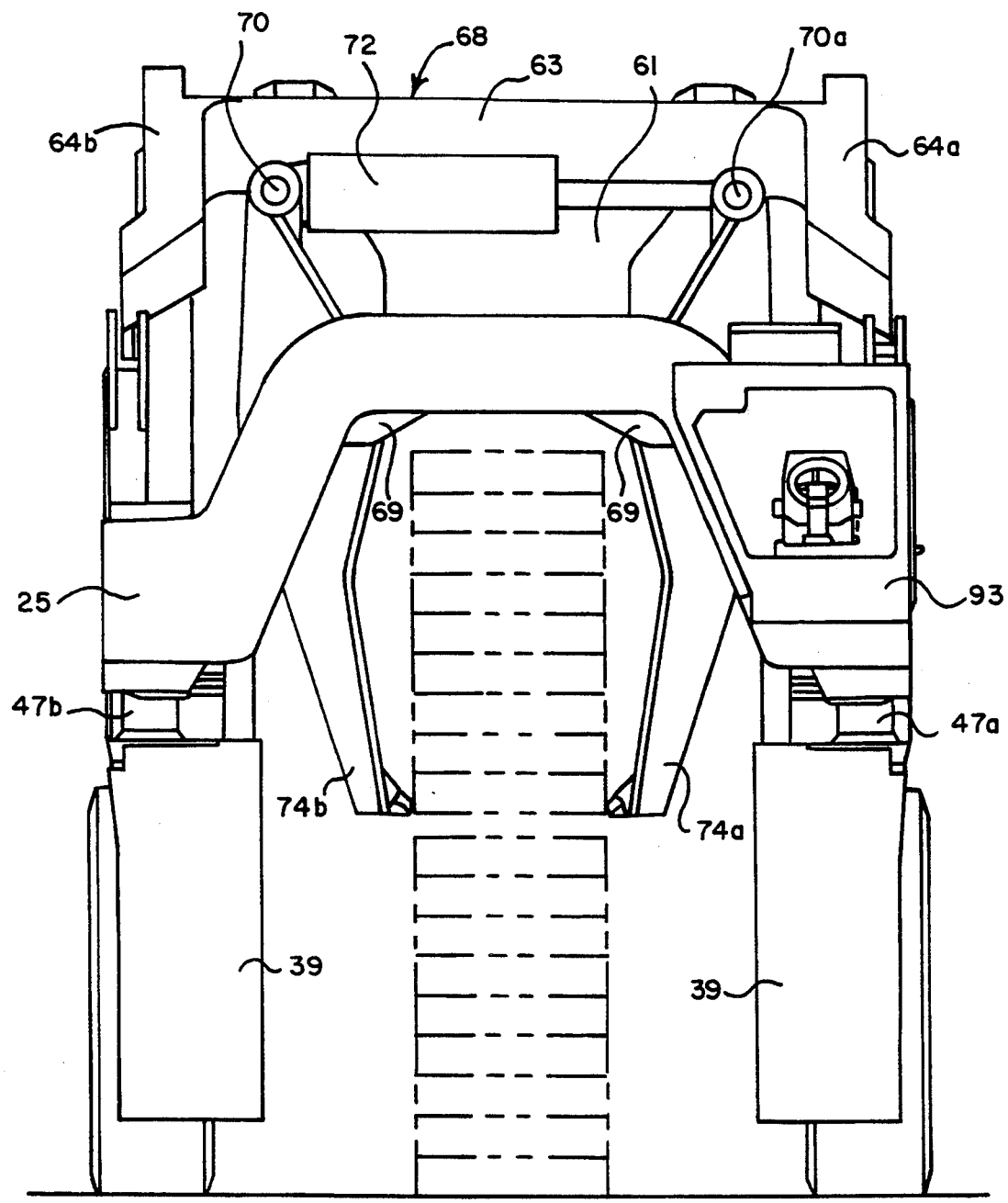

As shown in FIG. 2b, the vehicle 20 is capable of clearing a relatively substantial load even while carrying a load of approximately the same height. As a result, the lifted load can be transported over the other load or deposited onto the other load. It can be readily appreciated that once deposited, thereby effectively doubling the height of the first load, the load can be removed in the reverse manner.

When transporting a lifted load, the operator controls the drive train in a conventional manner to propel the wheels. By providing the stabilizing cylinders with hydraulic fluid from an accumulator 98, the stabilizing cylinders 84a and 84b further function as shock absorbers to keep the tong frame 62 level, particularly when rapidly accelerating or decelerating the vehicle 20.

To summarize, in FIG. 1, the straddle carrier 20 is shown carrying a load, such as a stack of steel slabs, of maximum height in its normal transport position. As will be seen here, the load is elevated above the ground to provide adequate running clearance even over an uneven surface. It is one important aspect of the invention that when the straddle carrier 20 is transporting a load of maximum height in the normal transport position, as shown in FIG. 1, the lift frame 68 is disposed within the outer envelope of the carrier and, more particularly does not extend substantially above the vertical clearance height of the carrier as defined by the upper surface of the cross beams 25, 26. It will also be seen that the upper surfaces of the operator's cab 93 and the engine 46a are also disposed substantially within the outer envelope of the carrier. This permits the carrier 20 to transport loads of maximum height under doorways and other overhead structures of relatively low clearance.

It is another feature of the invention that the lift frame 68 and tong assembly 60 are disposed and dimensioned to grip and raise a first load of maximum height with the lower surface thereof above the upper surface of a second load of maximum height resting on the ground. This permits the straddle carrier 20 to be driven over a load of maximum height and stack the load of maximum height being carried on top of the stack resting on the ground. Conversely, of course, the straddle carrier can be driven over a stack of slabs having a height twice that of the maximum load height and remove the upper half of the stack. This is shown in FIGS. 2a and 2b. It will also be appreciated that the straddle carrier can be driven either forward or backward over a previously deposited load of maximum height and deposit the carried load thereon. This gives the straddle carrier great versatility in forming or removing high stacks of slabs that are closely spaced in a storage yard.

Figure 10:
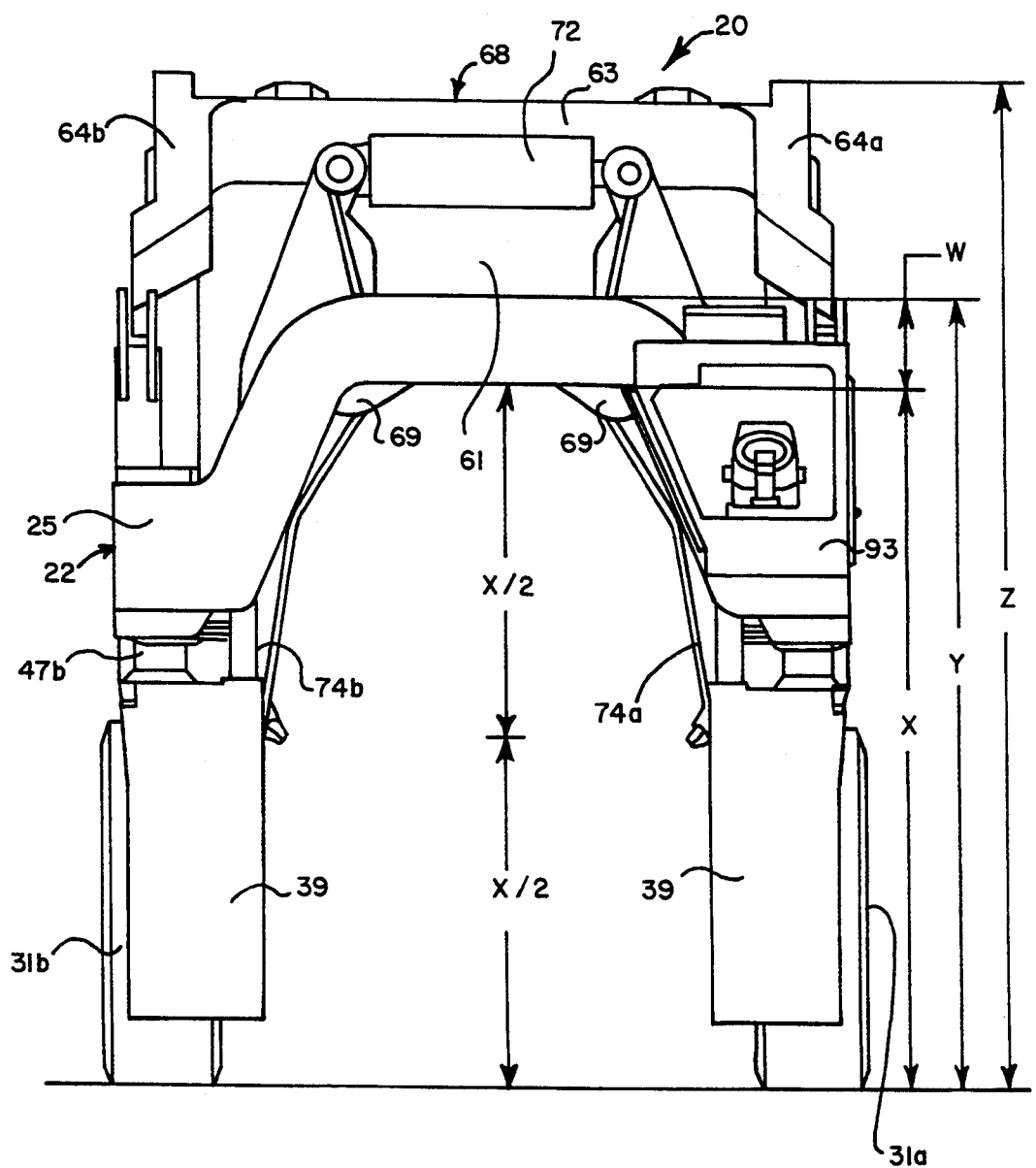
FIG. 10 is a front elevational view illustrating the relative dimensions of the vehicle with its lifting mechanism in a raised position.

Turning to FIG. 10, the straddle carrier 20, without a load, is shown with the lift frame 68 raised to its maximum height Z. This corresponds to the load carrying position shown in FIGS. 2a and 2b. It will also be seen in FIG. 10 that the wheels 31a–33a and 31b–33b, the strut assemblies 51 and the underside of the cross beams 25, 26 form a substantially tunnel-shaped load carrying space therebetween which defines the inner envelope of the carrier. This tunnel or inner envelope has a maximum height indicated at X which is the maximum height of a stack of slabs, or the like, that the carrier can straddle.

As also seen in FIG. 10, the length of the depending tongs 74a and 74b below the tong assembly 60 is designated X/2 and is equal to substantially one half the vertical dimension of the tunnel shaped load-carrying space within the carrier. It will also be noted that the lower ends of the tongs 74a and 74b are raised to a vertical height also designated X/2 or equal to substantially one half the height of the tunnel. It is, of course, these latter relationships that permit the straddle carrier 20 to stack or remove one load of maximum height on top of another load of maximum height as shown in FIG. 2. It will be appreciated that the maximum load height is somewhat less than the dimension X/2 to provide appropriate clearances as shown in FIGS. 2a and 2b. Moreover, the load can be only partially lifted as shown in FIG. 9 depending on the actual stack heights and operations to be performed thereon.

Another important feature of the straddle carrier of the present invention is that the maximum vertical height X within the load carrying tunnel of the carrier is as large as possible compared to the maximum vertical clearance height Y of the outer envelope of the carrier when a load of maximum height is being carried at normal transport position. Thus, the ratio of the height X of the tunnel-shaped load carrying space to the height Y of the outer envelope of the carrier 20 is at least 3 to 4. Stated somewhat differently, the ratio of the vertical dimension W between the inner and outer envelopes (Y-X) to the vertical dimension of the outer envelope is less than 1 to 4. If the preferred embodiment, the height X of the tunnel shaped space is about 85 percent of the height of the outer envelope of the carrier.

As can be seen from the foregoing, an apparatus has been provided for lifting, supporting and transporting heavy loads that can be driven in any direction over a load of relatively substantial height to straddle the load. The apparatus incorporates a drive train within the apparatus so that the apparatus is a self-propelled vehicle. At the same time, the vehicle has a relatively narrow envelope, but can pass beneath a relatively low overhead obstruction. Indeed, all of the components of the vehicle are essentially maintained within the lateral distance from the outer sidewall of the right wheels to the outer sidewall of the left wheels as considered when the wheels are straight. Thus, the entire vehicle can be driven through a width defined by the outer sidewalls of opposite wheels, yet the vehicle can vertically clear loads of relatively substantial height.

Moreover, the vehicle is highly maneuverable and maintains a carried load at a level position substantially independent of the load clamping location or the level of the terrain. This evenly distributes the weight of the vehicle and a carried load over all of its tires, even while on uneven terrain.

What is claimed is:

1. A self-propelled straddle carrier comprising, in combination, a main frame including a pair of spaced-apart, longitudinally extending side beams and at least one arch-shaped cross beam having a generally horizontally extending central portion and downwardly depending legs rigidly connected to said side beams, a plurality of wheels supporting said main frame with at least two wheels on each side disposed substantially directly under each of said side beams, said wheels being connected to said side beams by substantially vertically extending strut assemblies, said wheels, strut assemblies, side beams and cross beam having interior sides forming a substantially tunnel-shaped load carrying space therebetween defining an inner envelope of said carrier, said wheels, strut assemblies and side beams having exterior sides defining a maximum lateral clearance profile of said carrier, said cross beam having an upper side defining substantially a maximum vertical clearance profile of said carrier, and said maximum lateral and vertical clearance profiles forming an outer envelope of said carrier, a load supporting assembly suspended from said main frame for vertical movement up and down between said side beams for supporting and carrying a load in said tunnel-shaped load carrying space, lift means interconnecting said main frame and said load supporting assembly for raising and lowering said load, said lift means being disposed within said vertical clearance profile when said load supporting assembly is lowered, said lift means including a lift frame having a pair of legs with each leg disposed substantially directly above each of said side beams and pivotally connected thereto, means for connecting said lift frame and said load supporting assembly, and a pair of lift actuators connected between said side beams and said lift frame legs for raising and lowering said lift frame and load supporting assembly, each of said lift actuators being connected to one of said side beams by a support depending downwardly substantially directly below said side beam and said side beam being formed with a vertical opening therein through which said lift actuator extends upwardly for connection to said lift frame, and propulsion means including at least one engine and drive train connected to one of said wheels for reversibly driving said carrier, said propulsion means being mounted on said main frame and disposed substantially between said inner and outer envelopes of said carrier.

2. A self-propelled straddle carrier as defined in claim 1 wherein said tunnel-shaped load carrying space has a height and said outer envelope has a height and the ratio of the height of said tunnel-shaped load carrying space to the height of said outer envelope is at least 3 to 4.

3. A self-propelled straddle carrier as defined in claim 2 wherein the height of said tunnel-shaped load carrying space is about 85% of the height of said outer envelope.

4. A self-propelled straddle carrier as defined in claim 1 wherein each of said inner and outer envelopes has a vertical dimension and the vertical dimension between said inner and outer envelopes has a ratio to the vertical dimension of said outer envelope of less than 1 to 4.

5. A self-propelled straddle carrier as defined in claim 1 wherein said lift means is disposed below said vertical clearance profile when a load of maximum height is supported and raised to normal transport position off the ground.

6. A self-propelled straddle carrier as defined in claim 2 wherein said lift means includes a tong assembly disposed and dimensioned to grip and raise a first load of maximum height to a position above a second load of maximum height resting on the ground in order to stack said first load on or remove it from on top of said second load.

7. A straddle carrier as defined in claim 6 wherein said tong assembly includes at least one tong actuator and a pair of depending tongs having a predetermined length, said predetermined length of said depending tongs below said tong assembly being equal to substantially one half the height of said tunnel-shaped load carrying space.

8. A straddle carrier as defined in claim 1 including an operator's cab mounted on said main frame, said operator's cab having exterior walls disposed substantially between said inner and outer envelopes of said carrier.

9. A straddle carrier as defined in claim 1 wherein said plurality of wheels includes a front, a rear and a center wheel on each side of said carrier with said center wheel on each side being connected to said propulsion means and said front and rear wheels each being steerable.

10. A straddle carrier as defined in claim 9 wherein each of said strut assemblies includes a lineal fluid actuator having a cylinder connected to said side beam, a piston disposed for vertical movement within said cylinder and a piston rod connected to one of said wheels.

11. A straddle carrier as defined in claim 10 wherein said fluid cylinders for said front wheels on opposite sides of said carrier are hydraulically interconnected and said fluid cylinders for said center wheel and rear wheel on the same side of said carrier are each hydraulically interconnected.

12. A straddle carrier as defined in claim 6 wherein said tong assembly includes a tong support frame with a pair of tongs pivotally mounted at each end thereof and a pair of yoke arms for pivotally suspending said tong support frame from said lift frame.

13. A straddle carrier as defined in claim 12 including stablizing means for controlling the orientation of said tong support frame, said stabilizing means including a stabilizing member pivotally mounted on each side of said tong support frame and upper and lower ends projecting upwardly and downwardly therefrom, a guide channel secured to the inside of each of said side beams for receiving and guiding the lower end of each of said stabilizing members as said tong frame is raised and lowered, and a fluid actuator interconnecting the upper end of each of said stabilizer members and said lift frame for maintaining said tong support frame substantially level and for selectively tilting said tong support frame.

14. A straddle carrier as defined in claim 13 including selectively controllable hydraulic supply means for said fluid actuators, said supply means including a hydraulic accumulator for dampening surges in the hydraulic pressure in said actuators due to fore and aft shifts of a load carried by said tong assembly.

15. A straddle carrier as defined in claim 13 wherein said pivotal connection of said yoke arms to said lift frame defines a first arc of travel as said lift arms are raised and lowered, said guide channels are arcuate in shape and correspond to the first arc of travel of said pivotal connection of said yoke arms to said lift frame, and including roller means mounted on the lower ends of said stabilizing members for engaging said arcuate guide channels.

16. A straddle carrier as defined in claim 9 wherein said propulsion means includes a separate engine, transmission and drive train for the center wheel on each side of said carrier.

17. A straddle carrier as defined in claim 16 wherein said vertical strut assemblies for said wheels are telescopic to permit said wheels to move up and down over uneven terrain and said drive trains for said center wheels each include a vertical section that moves up and down with the associated one of said center wheels.

18. A self-propelled straddle carrier comprising, in combination, a main frame including a pair of spaced-apart, longitudinally extending side beams and at least one cross beam rigidly connected to said side beams, a plurality of wheels supporting said main frame including at least a front and a rear wheel on each side disposed substantially directly under each of said side beams, said wheels being connected to said side beams by substantially vertically extending strut assemblies, said wheels, strut assemblies, side beams and cross beam having interior sides forming a substantially tunnel-shaped load carrying space therebetween defining an inner envelope of said carrier, said wheels, strut assemblies and side beams having exterior sides defining a maximum lateral clearance profile of said carrier, said cross beam having an upper side defining substantially a maximum vertical clearance profile of said carrier, and said maximum lateral and vertical clearance profiles forming an outer envelope of said carrier, means for steering at least said front wheels relative to the main frame, said steering means including a hydraulic actuator comprising a cylinder having a head end with a predetermined effective internal cross sectional area and a rod end with a smaller effective internal cross sectional area, a piston slidably mounted in each cylinder for extension and retraction therein, and a piston rod mechanically coupled to each piston and to a corresponding steerable wheel such that extension of each piston rod turns the corresponding wheel in one direction relative to the main frame and retraction of the piston rod turns the corresponding wheel in an opposite direction relative to the main frame, means including an operator controlled valve for selectively supplying and discharging hydraulic fluid from the head ends and the rod ends of said cylinders, said supply and discharge means including fluid flow proportioning means for controlling volumetric fluid flow to or from said head ends of said cylinders and to or from said rod ends of said cylinders in a ratio substantially equal to that of the effective internal cross sectional areas of said head ends to said rod ends of said cylinders, a load supporting assembly suspended from said main frame for vertical movement up and down between said side beams for supporting and carrying a load in said tunnel-shaped load carrying space, lift means interconnecting said main frame and said load supporting assembly for raising and lowering said load, said lift means being disposed within said vertical clearance profile when said load supporting assembly is lowered, and propulsion means including at least one engine and drive train connected to one of said wheels for reversibly driving said carrier.

19. A straddle carrier as defined in claim 18 wherein both the front wheels and the rear wheels are steerable and the hydraulic cylinders are connected to the wheels and operated such that when the piston rods of two of the cylinders are extended the piston rods of the other two cylinders are simultaneously retracted, the front wheels turn in one direction relative to the main frame and the rear wheels turn in the opposite direction relative to the main frame.

20. A straddle carrier as defined in claim 19 wherein the two retracted piston rods are on one side of the vehicle and the two extended piston rods are on the other side of the vehicle.

21. A straddle carrier as defined in claim 19 further comprising means for determining the lineal extension of the four piston rods, means for evaluating the extension amounts, and means for adjusting the extensions of three of the piston rods, wherein the amount of extension of a first predetermined piston rod is determined and evaluated and the extensions of the three other piston rods are individually adjusted to predetermined amounts in dependence on the amount of extension of the first predetermined piston rod.

22. A straddle carrier as defined in claim 21 wherein the means for determining the amount of piston rod extensions includes a plurality of transducers for providing signals corresponding thereto, the means for evaluating the extensions includes a microprocessor electrically connected to the transducers for evaluating the signals and outputting adjustment signals corresponding thereto, and the means for adjusting the cylinders comprises three auxiliary fluid valving systems associated with each of the three adjustable cylinders, the valving systems being responsive to the output adjustment signals from the microprocessor such that the auxiliary fluid valving systems individually provide hydraulic fluid to extend or retract their associated piston rods in accordance with the signals output by the microprocessor.

23. A straddle carrier as defined in claim 19 wherein the cylinders are mounted such that extension of the piston rods on one side of the carrier and retraction of the piston rods in the other side of the carrier turn the wheels so that the axles of the steered wheels are all pointed substantially to a common point.

24. A straddle carrier as defined in claim 19 wherein the positions of the steering cylinders are fixed relative to the main frame and the wheels are coupled to their associated steering cylinders through individual rotatable collars such that the extension of the piston rods rotates the collars in one direction and the retraction of the piston rods rotates the collars in the opposite direction.

25. A straddle carrier as defined in claim 24 wherein the rotatable collars are coupled to their associated wheels through scissors links such that the wheels are vertically displaceable relative to the main frame.

26. A straddle carrier as defined in claim 19 wherein said supply and discharge means includes a steering valve and said fluid flow proportioning means includes a flow control valve, and the steering valve provides fluid to the flow control valve for regulating the fluid flow such that the piston of each cylinder will retract or extend the same amount.

27. A straddle carrier as defined in claim 26 wherein the steering valve includes first and second ports and the fluid flow proportioning means includes first and second flow control valves each including four coaxial gear sets corresponding to the four cylinders, and wherein the first flow control valve is hydraulically connected to the first port and the second flow control valve is hydraulically connected to the second port of the steering valve.

28. A straddle carrier as defined in claim 27 wherein two of the gears in each of the gear sets are of a first width and the other two gears in each of the gear sets are of a second width and the ratio of the first widths to the second widths is equal to the ratio of effective internal areas of the head end of a corresponding cylinder to the rod end of the corresponding cylinder.

29. A self-propelled straddle carrier comprising, in combination,
a main frame including a pair of spaced-apart, longitudinally extending side beams and a pair of cross beams rigidly connected to said side beams,
a plurality of wheels supporting said main frame with at least two wheels on each side disposed substantially directly under each of said side beams adjacent the ends thereof, said wheels being connected to said side beams by substantially vertically extending strut assemblies and including a front pair of wheels and a rear pair of wheels,
a tong assembly suspended from said main frame for vertical movement up and down between said side beams, said tong assembly including at least one tong actuator and a pair of depending tongs for gripping and carrying a load below said cross beams and between said wheels,
lift means interconnecting said main frame and said tong assembly for raising and lowering said tong assembly,
means for steering at least the front pair of said wheels relative to the main frame, said steering means including a hydraulic actuator comprising a cylinder having a head end with a predetermined effective internal cross sectional area and a rod end with a smaller effective internal cross sectional area, a piston and a piston rod mechanically coupled to each of the steerable wheels such that extension of each piston rod turns the corresponding wheel in one direction relative to the main frame and retraction of the piston rod turns the corresponding wheel in an opposite direction relative to the main frame,
means including an operator controlled valve for selectively supplying and discharging hydraulic fluid from the head ends and the rod ends of said cylinders, said supply and discharge means including fluid flow proportioning means for controlling the volumetric fluid flow to or from said head ends of said cylinders and to or from said rod ends of said cylinders in a ratio substantially equal to the ratio of the effective internal cross sectional areas of said head ends to said rod ends of said cylinders,
and propulsion means including at least one engine and drive train connected to one of said wheels for reversible driving said carrier.

30. A straddle carrier as defined in claim 29 wherein both the front pair of wheels and the rear pair of wheels are steerable and the hydraulic cylinders are connected to the wheels and operated such that when two of the piston rods are retracted and when the other two of the piston rods are extended the front wheels turn in one direction relative to the main frame and the rear wheels turn in the opposite direction relative to the main frame.

31. A straddle carrier as defined in claim 30 further comprising means for determining the amounts of extension of four of the piston rods, means for evaluating the extension amounts, and means for adjusting the extensions of three of the piston rods, wherein the amount of extension of a first predetermined piston rod is determined and evaluated and the extensions of the three other piston rods are individually adjusted to predetermined amounts in dependence on the amount of extension of the first predetermined piston rod.

32. A straddle carrier as defined in claim 31 wherein the means for determining the amount of piston rod extensions includes a plurality of transducers for providing signals corresponding thereto, the means for evaluating the extensions includes a microprocessor electrically connected to the transducers for evaluating the signals and outputting adjustment signals corresponding thereto, and the means for adjusting the cylinders comprises three auxiliary fluid valving systems associated with each of the three adjustable cylinders, the valving systems responsive to the output adjustment signals from the microprocessor such that the auxiliary fluid valving systems individually provide hydraulic fluid to extend or retract their associated piston rods in accordance with the signals output by the microprocessor.

33. A straddle carrier as defined in claim 30 wherein the cylinders are mounted such that extension of the piston rods on one side of the carrier and retraction of the piston rods on the other side of the carrier turn the wheels so that the axles of the steered wheels are all pointed substantially to a common point.

34. A straddle carrier as defined in claim 30 wherein the positions of the steering cylinders are fixed relative to the main frame and the wheels are coupled to their associated steering cylinders through individual rotatable collars such that extension of the piston rods rotates the collars in one direction and retraction of the piston rods rotates the collars in the opposite direction.

35. A straddle carrier as defined in claim 34 wherein the rotatable collars are coupled to their associated wheels through scissors links such that the wheels are vertically displaceable relative to the main frame.

36. A straddle carrier as defined in claim 30 including a center pair of wheels and wherein said vertical strut assemblies for said wheels are telescopic to permit said wheels to move up and down over uneven terrain and said drive trains for said center pair of wheels each include a vertical section that moves up and down with the associated one of said center wheels.

37. A straddle carrier as defined in claim 36 wherein said supply and discharge means includes a steering valve and said fluid flow proportioning means includes a flow control valve, and the steering valve provides fluid to the flow control valve for regulating the fluid flow such that the piston of each cylinder will retract or extend the same amount.

38. A straddle carrier as defined in claim 37 wherein the steering valve includes first and second ports and the fluid flow proportioning means includes first and second flow control valves each including four coaxial gear sets corresponding to the four cylinders, and wherein the first flow control valve is hydraulically connected to the first port and the 39. A straddle carrier as defined in claim 38 wherein two of the gears in each of the gear sets are of a first width and the other two gears in each of the gear sets are of a second width and the ratio of the first widths to the second widths is equal to the ratio of effective internal areas of the head end of a corresponding cylinder to the rod ends of the corresponding cylinder.

40. A straddle carrier as defined in claim 29 wherein said plurality of wheels includes three wheels on each side of said carrier with the center wheel on each side being connected to said propulsion means and the end wheels each being steerable.

41. A straddle carrier as defined in claim 29 wherein each of said strut assemblies includes a fluid cylinder connected to said side beam and a piston disposed for vertical movement within said cylinder and having a piston rod connected to one of said wheels, said fluid cylinders for said front wheels being hydraulically interconnected and said fluid cylinders for said center wheel and rear wheel on the same side of said carrier each being hydraulically interconnected.

42. A self-propelled straddle carrier comprising, in combination,
   a main frame including a pair of spaced-apart side beams having facing inside portions, and at least one cross beam rigidly connected to said side beams,
   a plurality of wheels supporting said main frame,
   a tong assembly suspended from said main frame for vertical movement up and down, said tong assembly including a tong support frame with a pair of tongs pivotally mounted at each end thereof and a tong actuator for clamping each pair of tongs to a load,
   lift means interconnecting said main frame and said tong assembly for raising and lowering said tongs, said lift means including a lift frame pivotally mounted on said main frame and at least one lift actuator for pivotally raising and lowering said lift frame and a pair of yoke arms for pivotally suspending said tong support frame from said lift frame,
   stabilizing means for controlling the orientation of said tong support frame, said stabilizing means including a stabilizing member pivotally mounted on each side of said tong support frame and having upper and lower ends projecting upwardly and downwardly therefrom, a guide channel secured to the inside portions of each of said side beams for receiving and guiding the lower end of said stabilizing member as said tong frame is raised and lowered, and a fluid actuator interconnecting the upper end of each of said stabilizer members and said lift frame for maintaining said tong support frame substantially level and for selectively tilting said tong frame.

43. A straddle carrier as defined in claim 42 including selectively controllable hydraulic supply means for said fluid actuators, said supply means including a hydraulic accumulator for dampening surges in the hydraulic pressure in said actuators due to fore and aft shifts of a load carried by said tong assembly.

44. A straddle carrier as defined in claim 42 wherein said pivotal connection of said yoke arms to said lift frame defines a first arc of travel as said lift arms are raised and lowered, said guide channels are arcuate in shape and correspond to the first arc of travel of said pivotal connection of said yoke arms to said lift frame, and including roller means mounted on the lower ends of said stabilizing members for engaging said arcuate guide channels.

* * * * *

UNITED STATES PATENT AND TRADEMARK OFFICE
CERTIFICATE OF CORRECTION

PATENT NO.  : 5,368,434
DATED       : NOVEMBER 29, 1994
INVENTOR(S) : EDWARD S. KRESS, DENNIS R. THOMAS AND MICHAEL A. RABAS

It is certified that error appears in the above-identified patent and that said Letters Patent is hereby corrected as shown below:

Column 2, line 13, delete "the" and substitute therefor -- side --;

Column 7, line 10, delete "combined" and substitute therefor

-- combiner --; and

Column 9, line 10, delete "14" and substitute therefor -- - --.

IN THE CLAIMS:

Column 19, line 10 after "and the" insert -- second flow control valve is hydraulically connected to the second port of the steering valve. --.

Signed and Sealed this

Fourth Day of April, 1995

*Attest:*

BRUCE LEHMAN

*Attesting Officer*    Commissioner of Patents and Trademarks